United States Patent [19]
Keskitalo

[11] Patent Number: 5,690,346
[45] Date of Patent: Nov. 25, 1997

[54] HUMAN POWERED DRIVE-MECHANISM WITH VERSATILE DRIVING MODES

[76] Inventor: Antti M. Keskitalo, 4014 Norwood Dr., Columbus, Ga. 31907

[21] Appl. No.: 508,386

[22] Filed: Jul. 31, 1995

[51] Int. Cl.$^6$ ........................................ B62M 1/04
[52] U.S. Cl. ................ 280/234; 280/246; 280/252; 482/57; 482/62
[58] Field of Search .......................... 280/233, 234, 280/243, 251, 288.1, 252, 253, 244, 246; 482/57, 62; 74/143

[56] References Cited

U.S. PATENT DOCUMENTS

| | | | |
|---|---|---|---|
| 3,760,905 | 9/1973 | Dower | 280/233 |
| 4,052,912 | 10/1977 | Vukelic | 280/253 |
| 4,437,677 | 3/1984 | Ksayian . | |
| 4,639,007 | 1/1987 | Lawrence | 280/234 |
| 4,811,964 | 3/1989 | Horn . | |
| 4,886,287 | 12/1989 | Krause, II et al. | 280/246 |
| 5,125,677 | 6/1992 | Ogilvie . | |
| 5,137,501 | 8/1992 | Mertesdorf | 482/57 |
| 5,242,181 | 9/1993 | Fales . | |
| 5,272,928 | 12/1993 | Young . | |
| 5,280,936 | 1/1994 | Schmidlin . | |

*Primary Examiner*—Brian L. Johnson
*Assistant Examiner*—Gary Savitt

[57] ABSTRACT

A frame (12) supporting two oscillatably movable members (16R) and (16L) for arms, and two reciprocally movable members (18R) and (18L) for feet. Cables (36) going off in pairs from each of the movable members in opposing directions, redirected by pulleys (34) toward and connected to rotatable members (14). Rotatable members (14) are coaxially connected with a sprocket wheel (42), and are also interconnected by additional cables (31) via pulleys (30) that are held back by springs (40), so as to cause one of a pair of rotatable members (14) to freely ratchet backwards while another one is turning forward. Sprocket wheel (42) is connected with a sprocket chain (44) to a vehicle propelling member (46). Handles (22R) and (22L) are connected with sleeved cables (26) to the topmost parts of movable members (16R) and (16L), and sleeved cables (26) connected at their other ends through a sleeved cable harness (282) to a steering pulley (28), that in turn is solidly connected to vehicle steering member (13). Each one of the movable members are connected to two of cables (36) and two of rotatable members (14) as described above forming individual power trains with two directional power stroke for each one of the movable members. Thus, collectively providing for versatile driving modes where each one of the movable members can be operated individually.

9 Claims, 7 Drawing Sheets

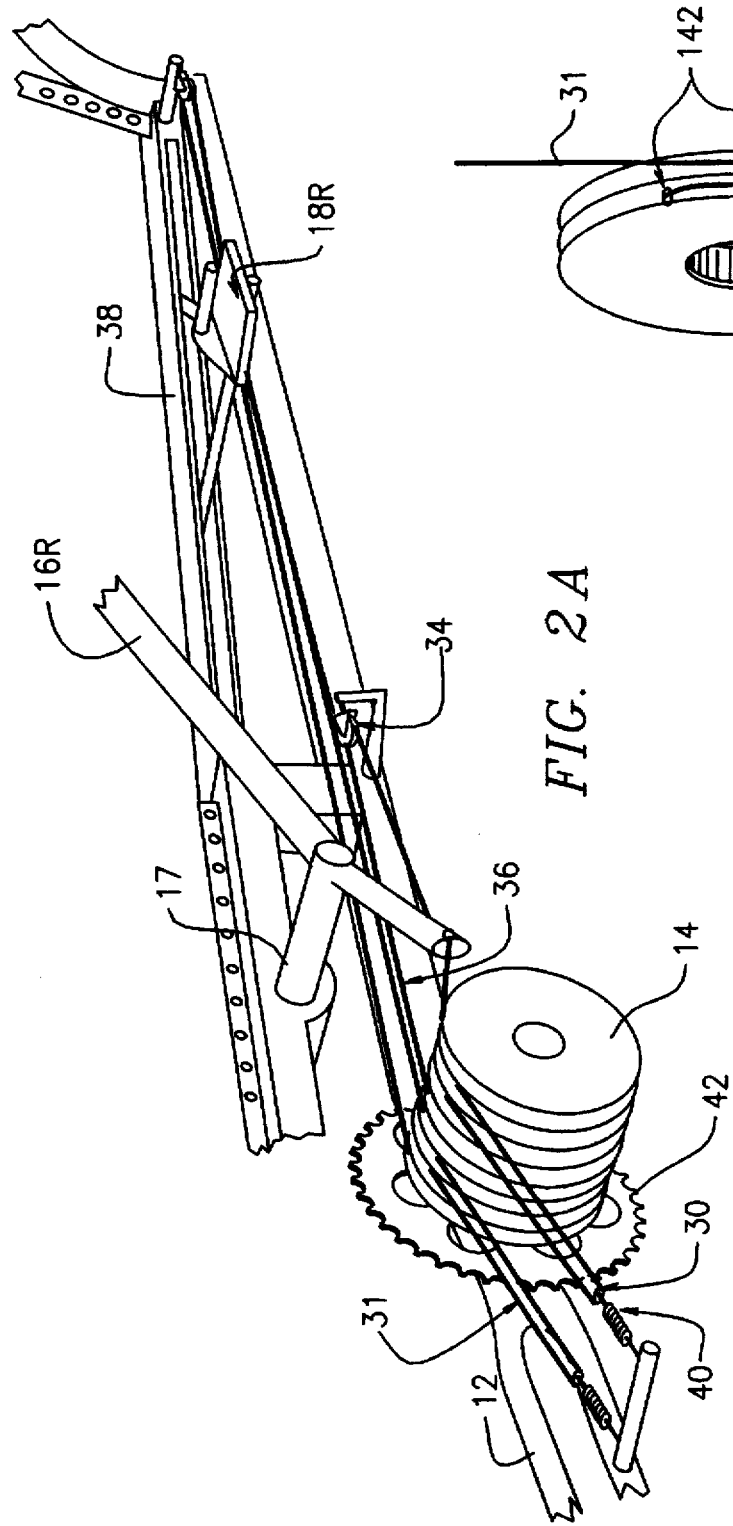
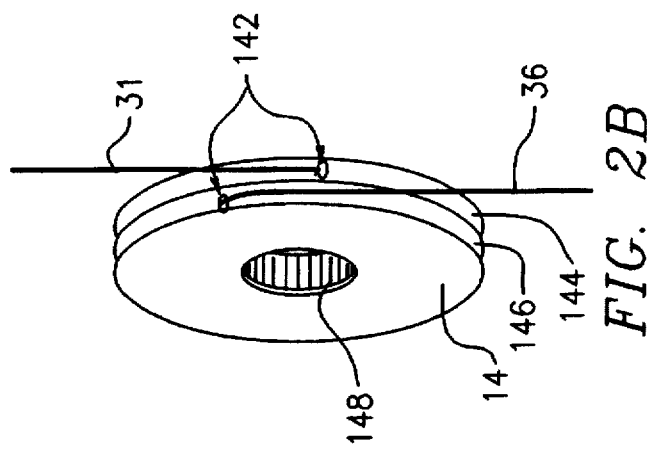
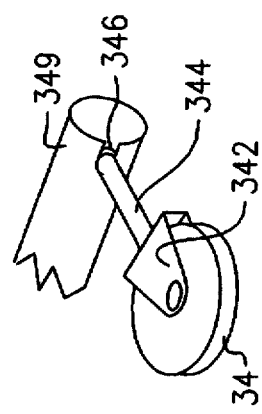
FIG. 2A
FIG. 2B
FIG. 2C

5,690,346

HUMAN POWERED DRIVE-MECHANISM WITH VERSATILE DRIVING MODES

BACKGROUND - FIELD OF INVENTION

This invention relates to any human powered vehicles and stationary apparatus where rotating motion is required or desirable.

BACKGROUND - DISCUSSION OF PRIOR ART

Commonly most human powered apparatus are still operated by pedalling action of one kind or another.

Some of the problems in this have been that it doesn't utilize all the power that can be exerted by a human body; provides for a very monotonous exercise; dead center of ordinary rotary pedals.

There is another problem, that seemingly hasn't completely been realized: almost all applications including the ones utilizing arms as well only provide for a single-directional power stroke.

This results in quite a considerable amount of potential power and exercising value remaining unutilized, combined with the fact that even if also arms are utilized only a fairly monotonous exercise or driving mode can be applied.

Here is some examples of more recent attempts to achieve an improved power utilization and/or exercise:

U.S. Pat. No. 5,280,936 Jan. 25, 1994 to Dennis Schmidlin where both arms and legs are utilized to create a single-directional power stroke part of which is wasted in stretching a spring. Only one kind of driving mode is provided for (i.e. rowing). Steering can get awkward in sharp turns.

U.S. Pat. No. 5,272,928 Dec. 28, 1993 to Douglas M. Young where a handlebar can be used for a two directional power stroke but one will have to pull or push with both arms at the same time i.e. can't pull or push either direction at ones choice. Steering can get awkward. Pedals have a single-directional power stroke and one has to also extend a spring as part of the power stroke.

U.S. Pat. No. 5,242,181 Sep. 7, 1993 to H. Russel Fales and Tyrus Sarnella where only footpedals are used.

U.S. Pat No. 5,125,677 Jun. 30, 1992 to Frank R. and James W. Oglivie where only pedals are used and also springs have to be extended as part of the power stroke.

U.S. Pat. No. 4,811,964 Mar. 14, 1989 to Douglas J. Horn where a wheelchair is disclosed with two directional power stroke through a single handlebar. This, especially with the steering can get fairly awkward for a handicapped who cannot gain balance with their feet.

U.S. Pat. No. 4,437,677 Mar. 20, 1984 to Haig Ksayian where two directional power stroke with arms and legs can be applied. However, both arms and legs have to move parallelly and combined with the sitting position, provides for a very limited power utilization and exercise. Steering again can get awkward.

All of these examples leave hardly any choice to the operator in what body motions he wishes to go through, to propel the vehicle forward, and the steering in all of the arm and leg applications can get fairly awkward, or one needs to stop pedalling or rowing while steering into a sharp turn.

Propably the reason why more versatile and effective applications haven't been devised yet, is that the attempts on arm and leg powered drive systems have gotten fairly complicated already. So, anything more versatile like all four limbs being provided with their respective independently operating power trains might seem like it would get too complicated and heavy to be feasibly and it might just not even seem necessary at a brief glance.

Additionally, since all of the "rowing action" inventions have their own specific features and provide for only a limited amount of variable driving modes, it becomes even more a matter of an individual preference as to which one, if any, would a person want to use.

The above is the reason for a drive mechanism that allows for completely versatile driving modes that can be switched at any time depending on what muscle groups, the driver wishes to use.

Objects and Advantages

Accordingly several objects and advantages of my invention are:

a) completely versatile driving modes b) very easy steering mechanism operable by hands (not arms)

c) a complete utilization of all major muscle groups e) both pulling and pushing with all limbs in any relative directions and distances can provide a power stroke f) one can stop moving any limb at any time one wishes to while continuing to propel with other limbs. Here is some exmples of the above:

i) one could do the rowing action by parallelly pulling and pushing with arms and legs ii) then one might want to switch to pushing with right leg and pulling with right arm while retracting left leg and pushing with left arm, then in reverse etc.

iii) then one might wish to enjoy the scenery, change into a lower gear and continue to leisurely push and pull with only the left arm g) even if one continues to push and pull with any one of the four limbs, it's entirely up to the operator how much force he exerts with each limb and whether one applies more force by pulling or pushing h) one can alternate different muscle groups to gain more efficiency during longer periods of riding i) in the embodiment of this invention for the handicapped for the first time drivability and speeds similar to a regular bike can be achieved by a person unable to move their legs. This is a great advantage meaning a lot to the handicapped who now is able to go out with his friends on bikes to a park on a day off and even race a regular bike. The reason I'm saying they could actually race a regular bike is this: in a regular bicycle only an average power of one leg can be utilized to propel the bike forward since at any given time only one leg is providing the power stroke. Since the strength in average two arms approximates an average strength of one leg, and since this invention provides for two arms continually exerting a power stroke, then one could approximate the speed of a regular bike with this "bike" for the handicapped.

Further objects and advantages of my invention will become apparent from a consideration of the drawings and ensuing description.

BRIEF DESCRIPTION OF DRAWINGS

FIG. 2A to 2C show a more detailed perspective view of a right-hand side drive mechanism and some related individual parts.

REFERENCE NUMERALS IN DRAWINGS

| 12 | frame | 13 | steering member |
|---|---|---|---|
| 14 | rotatable members | 15 | rotatable shaft |
| 16R | right-hand side movable member for an arm | 16L | left-hand side movable member for an arm |
| 17 | pivot shaft for a movable member for an arm | 18R | right-hand side movable member for a foot |
| 18L | left-hand side movable member for a foot | 181 | bar to allow pedal to be retracted |
| 182 | sliding pedal frame | 184 | pedal frame rollers |
| 186 | chamber for pedal frame rollers | 188 | siding |
| 189 | pedal | 20 | seat |
|  |  | 22R | right-hand side handle |
| 22L | left-hand side handle | 221 | pulley solidly joined to a handle |
| 223 | pivot for a handle and pulley |  |  |
| 225 | opening for steering cables | 227 | slot for a sleeve of a sleeved cable |
| 229 | slot for cable attachment | 26 | sleeved cables |
|  |  | 28 | steering pullie |
| 30 | pulleys | 31 | additional flexible extensions |
| 282 | sleeved cable harness |  |  |
| 34 | redirecting pulleys | 342 | bracket to hold a pulley |
| 344 | stem | 346 | enlarged stem tip |
|  |  | 349 | projection from a frame |
| 36 | flexible, unstretchable extensions | 38 | adjustable bar supporting movable members for feet |
|  |  | 40 | springs |
| 42 | sprocket wheels | 44 | sprocket chain |
| 46 | vehicle propelling member | 142 | slots for flexible extention attachements |
| 144 | smaller groove for additional flexible extentions | 146 | larger groove for flexible extentions |
|  |  | 148 | grooves for ratchet assembly |

Description - FIGS. 1–3 and 5–7

Figure 1:
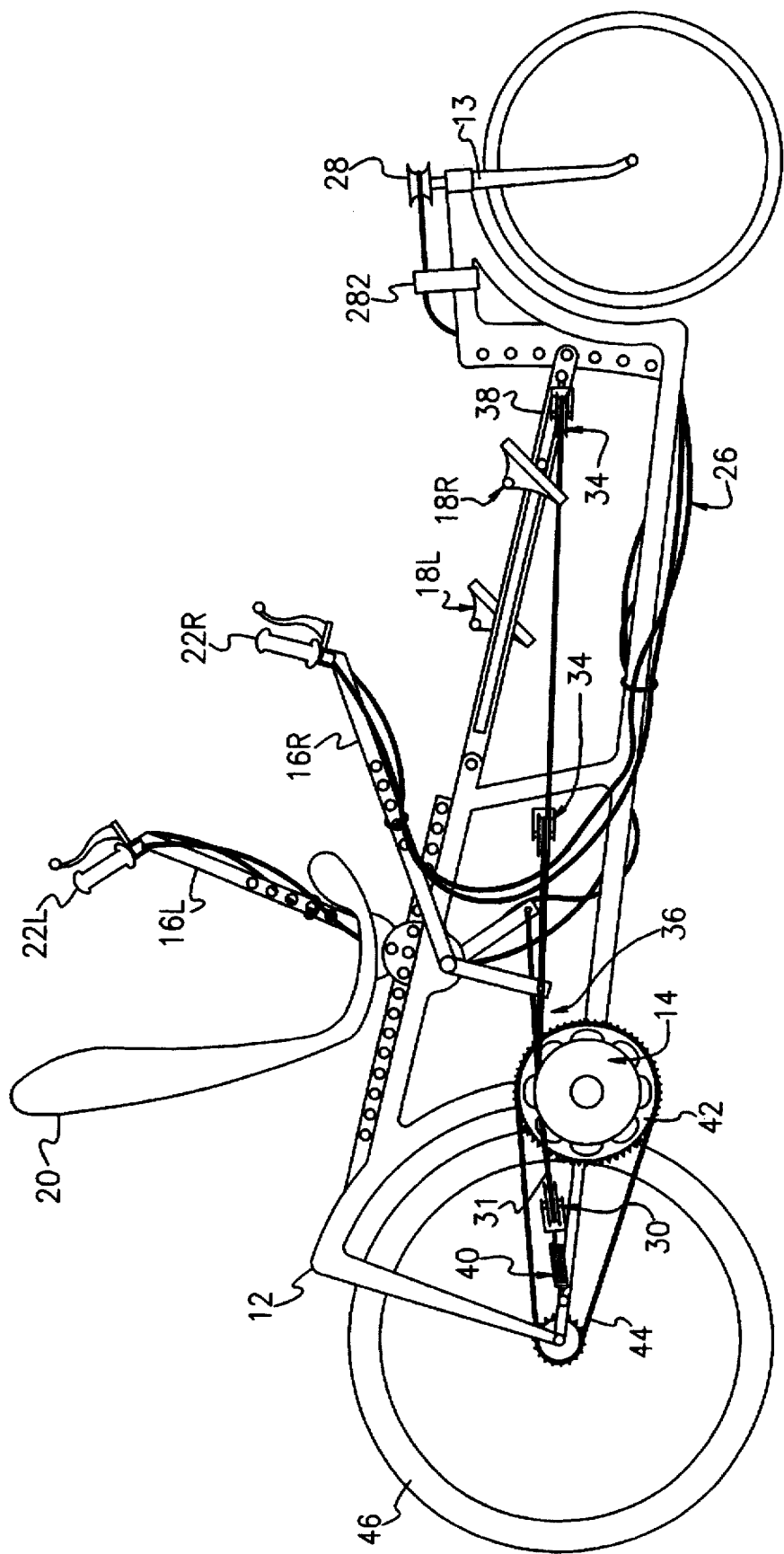
FIG. 1 shows a general side view of a preferred embodiment.

FIG. 1 showing a general side view of my drive mechanism including a frame 12 supperting: two movable members for arms 16R and 16L; two movable members for feet 18R and 18L connected with an adjustable bar 38 supporting movable members for feet, and a seat 20.

Flexible, unstretchable extensions 36, being cables herein, are attached to rotatable members 14 and each one of their respective movable members for feet 18R and 18L and movable members 16R and 16L going off in opposing directions of the movable members, then redirected by redirecting pulleys 34 toward and connected to rotatable members 14.

Additional flexible extensions 31 interconnect said rotatable members 14 in pairs via pulley 30 that are held back by springs 40 that in turn are connected to frame 12.

Handles 22R and 22L are connected to sleeved cables 26 and to the topmost part of movable members 16R and 16L, and sleeved cables 26 connected at their other ends through a sleeved cable harness 282 to a steering pulley 28 which in turn is solidly connected to a steering member 13.

A sprocket wheel 42 is attached to frame 12 coaxially with rotatable members 14 and also connected to a vehicle propelling member 46 with a sprocket chain 44.

In FIG. 2A we have a more detailed perspective view of a right-hand side drive mechanism showing a part of frame 12 supporting movable member for an arm 16R oscillatably connected with a pivot shaft 17 to frame 12 and movable member for a foot 18R being connected to flexible extensions 36 going off in opposing directions of movable members 16R and 18R and then redirected by redirecting pulleys 34 toward and connected to rotatable members 14 coaxially with each other and sprocket wheel 42 connected to frame 12.

Additional flexible extensions 31 interconnect rotatable members 14 in pairs with their respective movable members via pulleys 30 and are held back by springs 40 that in turn are connected to frame 12.

FIG. 2B showing just one of rotatable members 14 in this embodiment being a pulley with two grooves, a smaller groove 144 to accommodate one of additional flexible extensians 31 and a larger groove 146 for flexible extensions 36 and slots 142 for the flexible extension attachments. Also grooves 148 for a ratchet assembly are shown.

Figure 3:
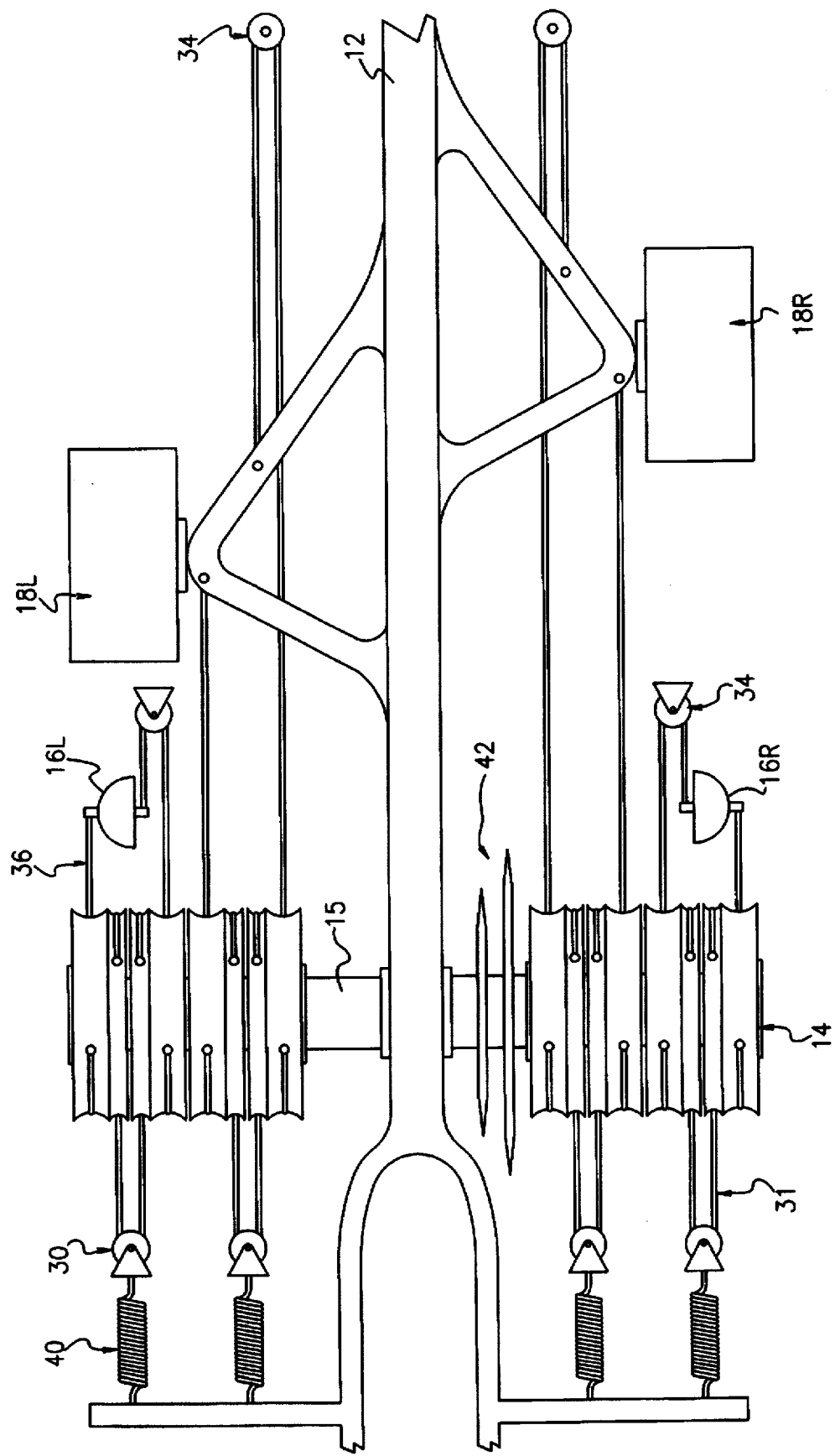
FIG. 3 shows a diagrammatic view from below of a complete drive mechanism.

FIG. 2C showing just one of redirecting pulleys 34 connected by a bracket 342 and a stem 344 with an enlarged tip 346 to a projection 349 from the frame FIG. 3 is a diagrammatic view from below of a complete drive mechanism with all parts as explained above.

Figure 5:
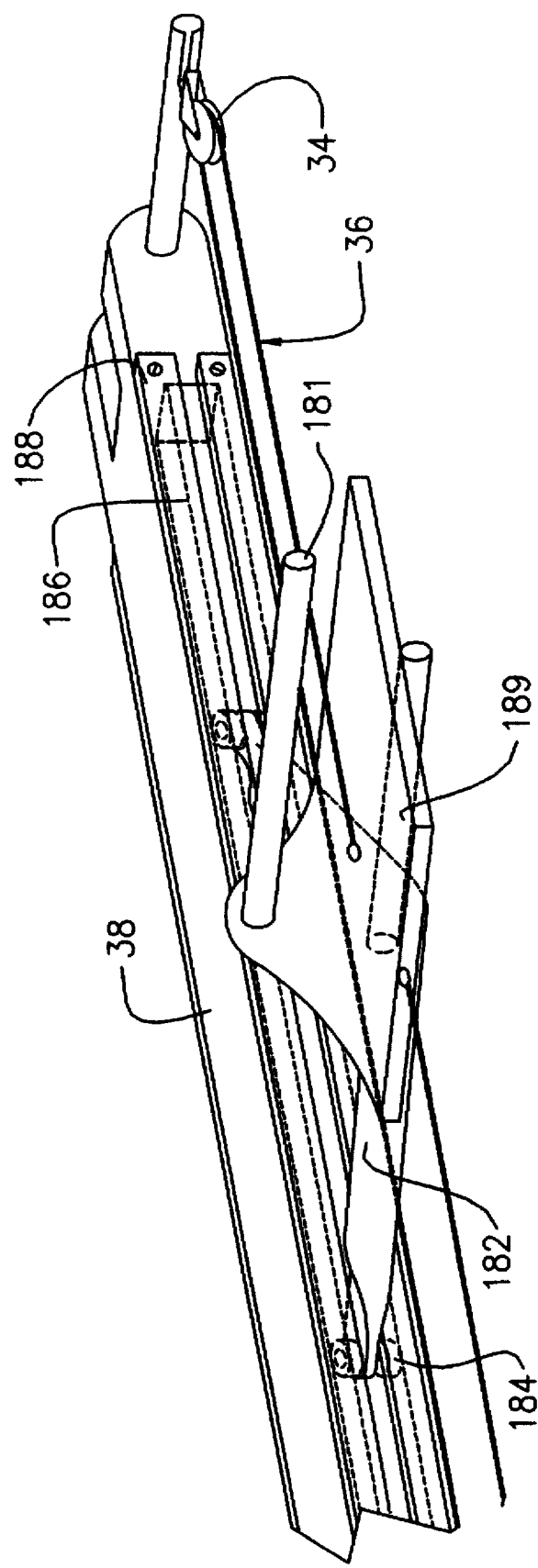
FIG. 5 shows an assembly of a right-hand side movable member for a foot.

FIG. 5 shows an assembly of right-hand side movable member for a foot 18R with a sliding pedal frame 182 supporting a pedal 189 and a bar 181 to allow pedal 189 to be retracted with sliding pedal frame 182 movably attached with pedal frame rollers 184 in a chamber 186 that is paretally closed by siding 188.

Figure 6:
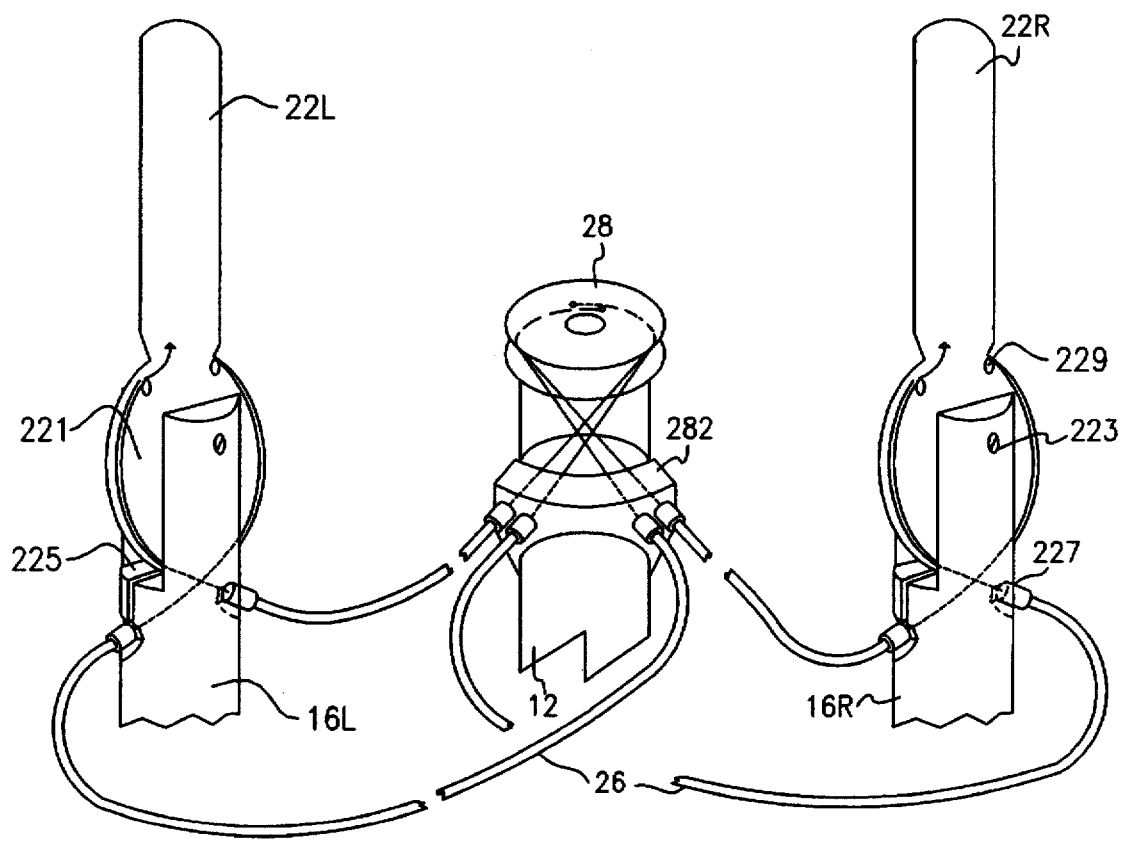
FIG. 6 shows a steering mechanism.

In FIG. 6 a steering mechanism is featured including both handles 22R and 22L being solidly joined with pulleys 221 and connected to each movable member for arms 16R and 16L at a pivot 223, and where sleeved cables 26 are connected at upper ends of pulleys 221 on opposing sides in slots 229 for cable attachment, then directed downward and made to cross in opening 225, and the sleeves of sleeved cables 26 attached to slots 227, and thereafter being directed towards steering pulley 28 thru and connected by the sleeves at sleeved cable harness 282, then made to cross in pairs and connected to said steering pulley 28 that in turn is solidly joined with vehicle steering member 13.

Sleeved cables 26 are connected from both left sides of handles 22R and 22L through right-hand side of sleeved cable harness 282 and from right sides of the handles through left-hand side of the harness.

Figure 7:
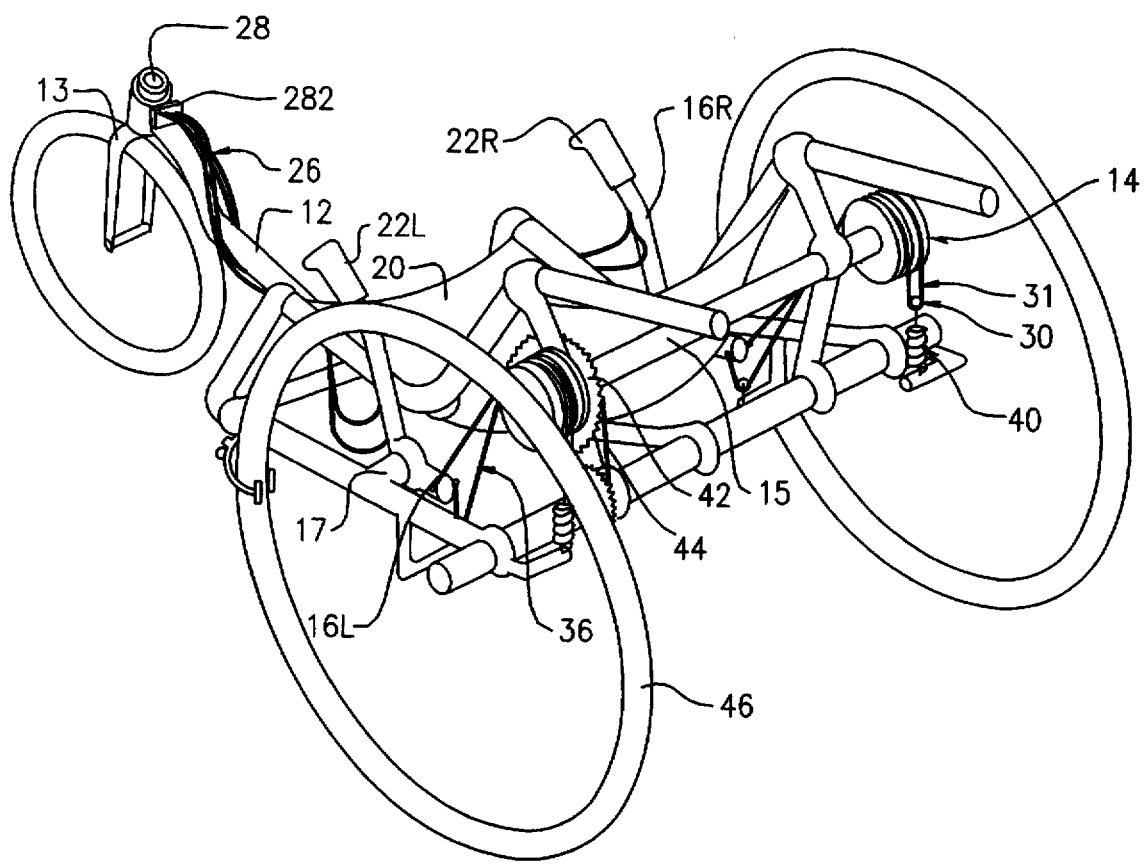
FIG. 7 shows an alternative embodiment of this invention for the handicapped.

FIG. 7 showing an alternative embodiment of my drive mechanism for the handicapped where the only difference is that the design of frame 12 has been altered as shown and where movable members for feet 18R and 18L (FIG. 1) have been left out.

Operation - FIGS. 1 to 4, 6

Figure 4:
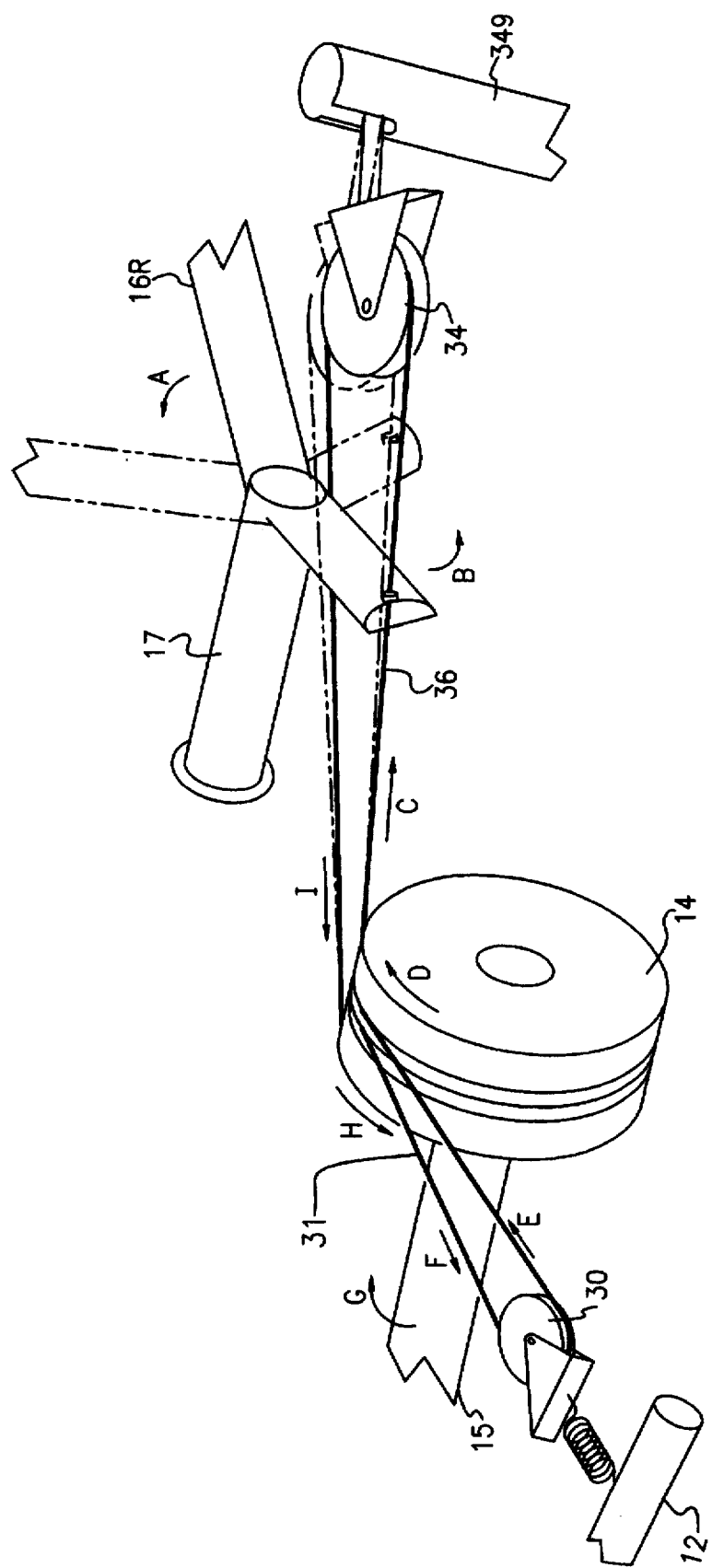
FIG. 4 shows a right-hand side movable member for an arm and its respective drive mechanism.

In FIG. 4 movable member for an arm 16R is featured as an example of how each movable member is hooked up in this human powered versatile drive mechanism.

Movable member 16R is being pulled to direction of arrow A and oscillates around pivot shaft 17 causing the lower section of movable member 16R to move in the direction of arrow B pulling one of the flexible extensions 36 in the direction of arrow C causing one of the rotatable members 14 to turn in the direction of the arrow D and due to the ratcheting assembly of each rotatable member 14 is causing shaft 15 to rotate in the direction of arrow G while also pulling additional flexible extensions 31 in the direction of arrow E and then in the direction of arrow F and now causing another rotatable member 14 freely ratchet backwards in the direction of arrow H while pulling another flexible extension in the direction of arrow I.

It should be noted that due to the circular motion of movable member 16R there will be some differences in the lenghts of the flexible extensions and, this is accommodated for with the assembly of redirecting pulleys 34, as previously discussed in FIG. 2C, and spring 40.

When the direction of oscillation in FIG. 4 is reversed then the direction of all the arrows also reverse and the other one of rotatable members 14 will rotate rotatable shaft 15 while the first one of the rotatable members will freely ratchet backwards.

As can be seen in FIG. 3 each movable member is connected to a pair of rotatable members 14 with a pair of flexible extentions 36 via redirecting pulleys 34, and where additional flexible extension 31 interconnects the rotatable members, resulting in each movable member individually operable as a unit to rotate rotatable shaft 15 in a single forward direction with a two directional power stroke, and collectively providing a great variability in driving modes.

The rotating motion of shaft 15 can then be transferred with sprocket wheel 42 (FIG. 1) and sprocket chain 44 to vehicle propelling member 46.

The steering mechanism as shown in FIG. 6 is operable by tilting handles 22R and/or 22L in either directions and accordingly causing sleeved cables 26 to roll onto one side of pulleys 221 and off the opposing side of steering pulley 28 resulting in steering to the direction of tilting being done.

Conclusion, Ramifications and Scope

Thus the reader will see that the drive mechanism of the invention provides for highly versatile driving modes leaving it entirely up to the individual of how he or she wants to drive it.

While my above description contains many speficities, these should not be construed as limitations on the scope of the invention, but rather as an exemplification of one preferred embodiment thereof. Many other variations are possible. For example a stationary exercising machine using this drive mechanism would provide for a complete total body work out with an extensive variability.

The design of the preferred embodiment or the secondary embodiment as featured herein could be considerably changed while still using the same drive system.

One could also provide for an additional power train with a movable seat with the same principles as described herein.

The vehicle as shown in the prefferred embodiment above does not have to be a wheeled land vehicle—it could as well be an aquatic or an aerial vehicle whenever a rotating motion can be used to propel the vehicle forward.

If one prefers a certain kind of a driving mode then interconnections of pedals and handlebars with additional cables and pulleys are possible.

Some other applications could be a drive mechanism for a manpowered generator or even a snow vehicle.

Accordingly, the scope of the invention should be determined not by the embodiments illustrated, but by the appended claims and their legal equivalents.

I claim:

1. A human powered drive mechanism comprising:
   a) a frame
   b) individually movable members
   c) flexible, unstrechable extensions
   d) rotatable members
   e) a rotatable shaft
   f) redirecting means
   g) additional flexible extention means
   h) said individually movable members being supported said frame, each individual movable member being connected to two of said flexible, unstrechable extentions, each of said flexible, unstrechable extentions extending away from said movable members in oppposite directions and then one of said flexible, unstrechable extensions being redirected by redirecting means in the direction of said rotatable members, each of said flexible, unstrechable extentions attached to a separate rotatable member
   i) said rotatable members being attached to said rotatable shaft so as to rotate the shaft when turned in one direction and freely ratchet backwards when turned in another direction
   j) said rotatable members being connected in pairs and attached to said additional flexible extension means, the attachment of said additional flexible extentsion means to said rotatable members causing, during operation, one of said rotatable members to ratchet backwards while another of said rotatable members turns said rotatable shaft forward
   k) a total of two of said flexible, unstrechable extentions, one of said redirecting means, two of said rotatable members, and one of said additional flexible extention means for each one of said movable members
   l) said rotatable shaft and said additional flexible extention means attached to said frame
   and whereby collectively providing means to cause a single-directional rotating motion of said rotatable shaft by said movable members operable individually with a complete versatility of driving modes and with a two directional power stroke.

2. The human powered versatile drive mechanism of claim 1 wherein said movable members are individually oscillatable handlebars and reciprocally movable footpedals.

3. The human howered versatile drive mechanism of claim 1 wherein said flexible, unstretchable extensions are cables.

4. The human powered versatile drive mechanism of claim 1 wherein said rotable members are pulleys.

5. The human powered versatile drive mechanism of claim 1 wherein said redirecting means are pulleys connected to said frame.

6. The humam powered versatile drive mechanism of claim 1 wherein said additional flexible extension means are cables travelling via pulleys that are held back and connected by springs to said frame.

7. The human powered versatile drive mechanism of claim 1 wherein said frame is designed as a vehicle comprising a vehicle propelling member and a steering member.

8. The human powered versatile drive mechanism of claim 7 further including a steering mechanism comprising
   a) two handlebars
   b) two handles solidly joined with pulleys at lower ends
   c) four sleeved cables
   d) a sleeved cable harness
   e) a steering pulley
   f) said two handles pivoted at the center of said pulleys to the topmost part of said two handlebars g) said sleeved cables connected in opposing sides to the topmost locations on said pulleys in pairs, then directed down and made to cross on said pulleys in spaces remaining between said pulleys and said handlebars and travelling to opposing sides of said handlebars in relation to connections of said sleeved cables on said pulleys h) sleeves of said sleeved cables solidly connected to both sides of said two handlebars closest to said handles, directed toward said steering member, and then solidly connected to said sleeved cable harness, where said sleeved cables connected at right sides of said handlebars are connected at left side of the harness by their sleeves, and the cables connected at left sides of said handlebars are connected at right side of the harness by their sleeves i) said sleeved cables travelling through openings in said sleeved cable harness, made to cross in pairs in a space remaining between the harness and and said steering pulley and then made to travel half a circle on said steering pulley and then connected to it j) said steering pulley solidly connected to said steering member and whereby both of said handlebars can be conveniently and individually operated while steering.

9. The human powered versatile drive mechanism of claim 7 further including a sprocket wheel solidly connected to said rotatable shaft, and a sprocket chain as means to transfer rotating motion to said vehicle propelling member.

* * * * *